United States Patent [19]

Varley

[11] Patent Number: 4,974,650
[45] Date of Patent: Dec. 4, 1990

[54] SAFETY GUARD STOP FOR POWER TOOL

[75] Inventor: David Varley, Spring City, Pa.

[73] Assignee: American Machine & Tool Company, Inc., Royersford, Pa.

[21] Appl. No.: 508,991

[22] Filed: Apr. 12, 1990

[51] Int. Cl.$^5$ .......................... B27C 1/00; B27G 21/00
[52] U.S. Cl. .................................. 144/251 B; 83/439; 144/129; 144/249 B; 144/253 F
[58] Field of Search ............ 83/439; 144/247, 249 R, 144/251 R, 251 B, 253 R, 253 F, 253 G, 129, 130

[56] References Cited

U.S. PATENT DOCUMENTS

| | | | |
|---|---|---|---|
| 2,099,519 | 11/1937 | Hedgpeth | 144/129 |
| 2,705,034 | 3/1955 | Gaskell | 144/251 B |
| 2,747,628 | 5/1956 | Ford | 144/247 X |

FOREIGN PATENT DOCUMENTS 21911 of 1905 United Kingdom ............ 144/251 B

Primary Examiner—W. Donald Bray

Attorney, Agent, or Firm—Panitch Schwarze Jacobs & Nadel

[57] ABSTRACT

A guard stop is used with a power tool that includes a work surface, a tool head that projects at least partially through the work surface, a fence on a first side of the tool head and a safety guard pivotally supported on an opposite side of the tool head. The safety guard is biased to an initial position proximal the fence to cover the tool head. The guard stop includes a bracket plate fixedly secured to the power tool on the second side of the tool head. A stop member plate is mounted to the safety guard pivot and is pivotable with respect to both the bracket plate and the safety guard. The stop member plate is removably secured to the bracket by a bolt and threaded fastener. The bolt passes through an elongated slot in the bracket and can be secured at any desired positon along the slot. A portion of the stop plate is turned perpendicularly to that plate to form a stop portion which contacts the safety guard and prevents further rotation of the safety guard from the fence.

20 Claims, 3 Drawing Sheets

SAFETY GUARD STOP FOR POWER TOOL

FIELD OF THE INVENTION

The invention relates to safety devices for power tools and, in particular, to a guard stop device that prevents a cutter safety guard from rotating open beyond an adjustable, selectable position for permitting only a work piece to pass between the guard and an opposing fence over a woodworking tool normally covered by the guard.

BACKGROUND OF THE INVENTION

Safety guards are typically provided over the cutter heads on woodworking power tools such as jointers/planers and other power tools. However, most guards are easily rotated open during operation of the tool in a manner which can expose the high-speed cutter blade beyond the edges of the work piece to possibly inflict injury on the operator. A power tool such as a jointer/planer typically includes a work surface which may be provided by separate but adjoining tables, a jointer/planer cutting tool head projecting at least partially through the work surface, for example, between the separate tables, a fence projecting upwardly from the work surface on a first side of the tool head and safety guard mounted on an opposing, second side of the head for movement from an initial position adjoining the fence and covering the tool head to a working position spaced from the fence and partially exposing the tool head to the work piece.

In the most common form of mounting, the guard is pivotally supported on the second side of the tool head and biased by suitable means such as one or more springs towards the fence so as to cover the tool head. The work piece is passed between the pivot and the fence. When the work piece strikes the guard, the guard rotates sufficiently away from the fence to expose the cutting tool head to the work piece. However, if the workman passes his fingers between the pivot and the fence on the side of the work piece adjoining the work surface, the workman's fingers are exposed to and can be cut by the head.

While a number of patents disclose various stop devices for cutter tool guards, most such devices are designed to stop the guard from striking the fence after being released by the work piece. These include, for example, U.S. Pat. Nos. 2,099,519, 2,123,627 and 2,747,628. Such devices provide no protection against opening of the guard to expose a portion of the cutting tool head along the side of the work piece where the operator's hand may be positioned.

U.S. Pat. No. 2,895,517 to Rhett discloses a finger guard mechanism for jointers. The mechanism includes a guard mounted on a swingable arm and held against the fence and work piece by springs. The mounting permits linear movement of the guard across the table towards and away from the fence. An adjustable limit stop is provided through a hinged knuckle coupled with the swingable arm. The guard further includes a plurality of spring loaded pins which are retracted by the work piece when the work piece is passed over the blade and which extend individually as the work piece passes each of them. The mechanism of Rhett is relatively complex involving multiple spring loaded arms supporting multiple spring loaded pins on a compound linkage. Not only would this device be expensive to manufacture and to properly install, it is not capable of being retrofitted onto power tools equipped with conventional, pivotally mounted safety guards.

The present invention resolves the problem of a simple, relatively inexpensive to manufacture and easy to install guard stop capable of being retrofitted or easily modified to retrofit into a variety of power tools using conventional, pivotally supported safety guards to control the permitted range of rotation of those guards to prevent exposing more of the cutting tool head than is necessary simply to pass a work piece between the guard and a fence of the tool.

SUMMARY OF THE INVENTION

The invention is a guard stop for use on a power tool having a work surface, a cutting tool head projecting at least partially through the work surface, a fence projecting transversely to the work surface on a first side of the tool head and a safety guard mounted on a pivot located generally on a second side of the tool head opposite the fence, the pivot supporting the safety guard for rotation across the work surface. The safety guard is biased to an initial position proximal the fence fully covering the projecting portion of the tool head. The safety guard is rotatable about the pivot from the initial position along a path away from the fence when contacted by an object passing between the fence and the pivot to at least partially expose the tool head to the object. According to the invention, the guard stop comprises bracket means adapted for being fixedly secured to the power tool and a stop member adapted to be movable among selectable positions on the bracket means, the stop member including a stop portion positioned along the path of the safety guard for contacting the safety guard when the stop member is located at any of the selectable positions. The guard stop further comprises securing means for releasably securing the stop member to the bracket means at any of the selectable positions.

BRIEF DESCRIPTION OF THE DRAWINGS

The foregoing summary, as well as the following detailed description of the presently preferred embodiment of the invention, will be better understood when read in conjunction with the appended drawings. It should be understood, however, that the invention is not limited to the precise arrangements illustrated. In the drawings.

DETAILED DESCRIPTION OF THE PREFERRED EMBODIMENT

Figure 1:
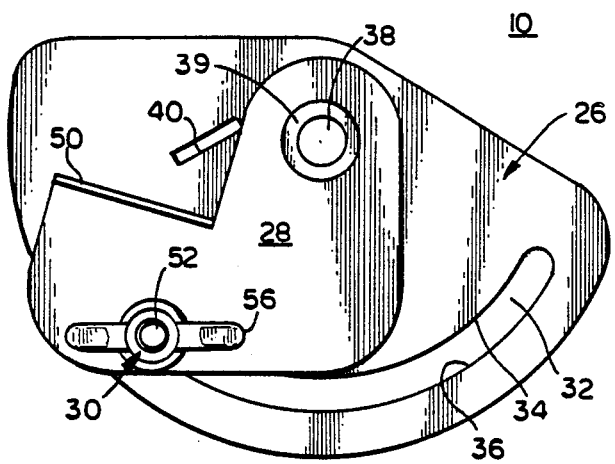
FIG. 1 is a top plan view of a guard stop of the present invention.
Figure 2:
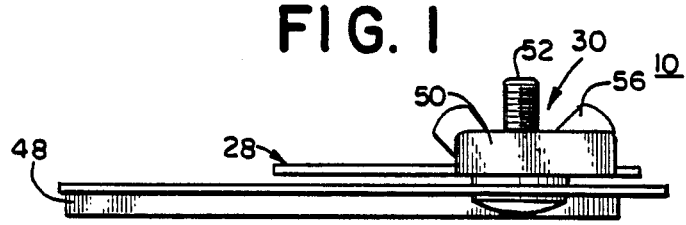
FIG. 2 is a rear elevation of the guard stop of FIG. 1.
Figure 3:
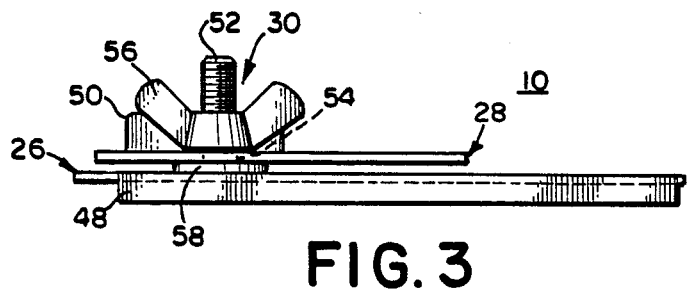
FIG. 3 is a front elevation of the guard stop of FIG. 1.
Figure 4:
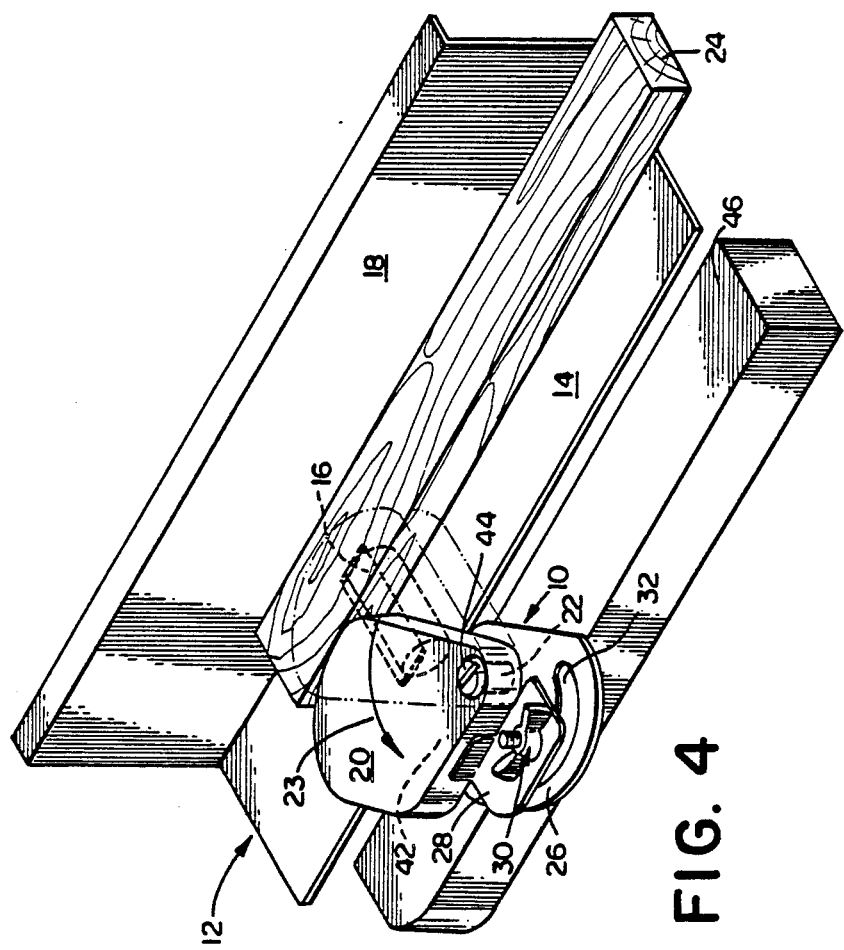
FIG. 4 is an isometric view showing the guard stop of FIGS. 1–3 installed on a woodworking power tool.

FIGS. 1 through 3 depict, in varying views, a guard stop of the present invention, indicated generally at 10, while FIG. 4 depicts the guard stop 10 mounted on a conventional woodworking power tool, indicated generally at 12.

Referring initially to FIG. 4, the upper components of a convention woodworking power tool 12 such as a jointer/planer are indicated diagrammatically to illustrate the relationship of certain components of the tool 12 to the guard stop 10. Power tool 12 includes a work surface, indicated generally at 14, which may be defined by one or more separate, adjoining tables, a cutting tool head, indicated in phantom at 16, projecting at least partially through the work surface 14, for example, between the table, a fence 18 projecting transversely, in particular, perpendicularly to the work surface 14 on a first side of the tool head 16 and a safety guard, indicated generally at 20, mounted on a pivot typically provided by a shoulder bolt 44, which is located on a second side of the tool head 16 opposite the fence 18. The shoulder bolt 44 is used to mount the safety guard 20 to the machine tool 12 and extends through a bore 22 through the safety guard 20, the bore 22 being indicated in phantom in FIG. 4. Bolt 44 supports the safety guard 20 for rotation across the work surface 14 and over the exposed head 16 of the power tool 12.

The safety guard 20 is biased to an initial position, shown in phantom in FIG. 4, proximal the fence 18 and fully covering the projecting portion of the tool head 16. The safety guard 20 may be biased by spring means, not depicted, in any of a variety of conventional ways. The safety guard 20 is rotatable about the pivot provided by bolt 44 from the initial position proximal the fence 18 away from the fence 18 along an arcuate path, which is indicated by curving arrow 23, when contacted by an object such as work piece 24 passing between the fence 18 and the pivot 22. Rotation is depicted by the solid representation of the safety guard 20 in FIG. 4. When pivoted away from the fence 18, the safety guard 20 thus at least partially exposes the tool head 16 to the work piece 24, permitting the work piece 24 to be cut by the tool head 16.

As is depicted in each of the FIGS. 1-4, the guard stop 20 of the present invention comprises bracket means indicated generally at 26, a stop member indicated generally at 28, and securing means indicated generally at 30. Referring to FIG. 1, the bracket means 26 is preferably in the form of a shaped, plate member that preferably includes an elongated, arcuate slot 32 defining a pair of elongated, arcuate opposing edges 34 and 36, a bore 38 and a rectangular slot 40. The bore 38 and rectangular slot 40 permit the bracket means plate 26 to be fixedly secured to the power tool 12. In particular, the bore 38 receives a portion of a shoulder bolt 44 (see FIG. 4) which extends vertically through the safety guard 20 and into a threaded opening (not depicted) in the cover member 46 of the power tool 12. The rectangular slot 40 is received in a tab member 42 which is indicated in phantom in FIG. 4. A member like tab 42 is typically provided in such machine tools 12, protruding upwardly from the power tool cover member 46, to act as a fixed stop preventing the safety guard 20 from rotating 360° about the pivot provided by bolt 44. The arc of movement of the safety guard 20 along path 23 from the fence 18 to the tab 42 is typically at least 90° and may be greater than 90°. The arc of the slot 32 is therefore suggestedly at least about 90° and preferably at least as long as the arc of movement of the guard 20 along path 23. When secured between the safety guard 20 and the cover member 46 with the rectangular slot 40 engaged with the cover member tab 42, the bracket means plate 26 is essentially fixedly secured to the power tool 12. As is indicated in FIGS. 2 and 3, the bracket means plate 26 is preferably provided with an arcuate flange portion 48 extending perpendicularly to the plane of the bracket means plate 26 and to the stop member 28. Arcuate flange portion 48 reinforces and stiffens the thin bracket means plate 26.

The stop member 28 preferably is also a shaped plate, preferably parallel to bracket means plate 26. Stop member 28 includes an edge portion turned perpendicular to the plane of the plate and away from bracket means plate 26, forming a stop portion 50 of the stop member 28. The stop member plate 28 further includes a bore 39 coaxial with the bore 38 of the bracket means plate 26. The bore 39 of the stop member plate 28 also receives the shoulder bolt 44 so as to be coaxially mounted with the bore 38 of bracket means plate 26 on the shoulder of bolt 44. Preferably, bore 39 is larger than bore 38 so that stop member can be rotatably mounted on a shoulder portion of bolt 44 or on a spacer received on a threaded portion of bolt 44 (see FIG. 6). Bore 38 is preferably sized to be received on the threaded portion of bolt 44 and fixed to the power tool 12 between the cover 46 and shoulder of the bolt 44. The stop member 28 is rotatable about the shoulder bolt 44 pivot with respect to the bracket means plate 26 along a continuous range of selectable positions on the bracket means plate 26. Thus mounted, the stop portion 50 is always positioned along the path 23 of the safety guard 20.

Figure 6:
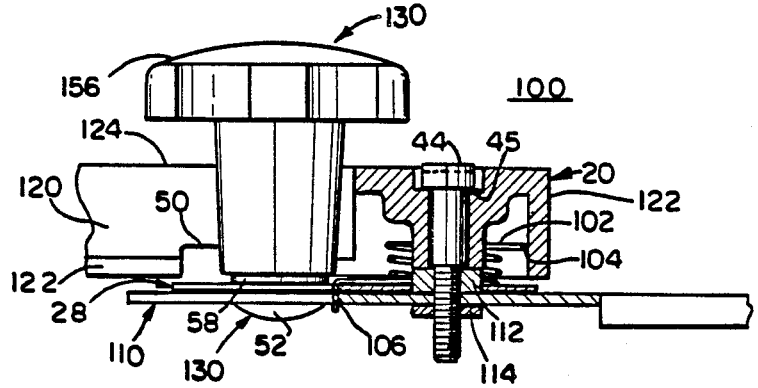
FIG. 6 is a front elevation of the assembly of FIG. 5 partially broken away along the lines 6—6 showing the mounting of the components of the safety guard with those of the guard stop.

The securing means 30 preferably comprises a threaded fastener 52 passing through the elongated arcuate slot 32 and a second bore 54 (in phantom in FIG. 3) in the stop member plate 28. Preferably, fastener 52 is a carriage bolt with a square shoulder which is received in slot 32 and prevents the bolt from turning about its central axis. The securing means further preferably comprises a female threaded, hand turnable member, for example, a wing nut 56 as depicted in FIGS. 1-3, a knob 156 as depicted in FIG. 6, a hex nut or other female fastener (neither depicted), received on the male threaded portion of fastener 52. An appropriately sized washer 58 can be positioned between the bracket means plate 26 and stop member plate 28 if the mounting of the plates 26 and 28 requires any spacing between the plates 26 and 28. When the bracket means plate 26 and stop member plate 28 are mounted to the shoulder bolt 44 pivot, the second bore 54 of the stop member 28, receiving the fastener 52, is aligned with the elongated arcuate slot 32 and aligns the threaded fastener 52 with that slot 32 and the edges 34 and 36 of that slot. The securing means 30 permits the stop member plate 28 to be releasably secured to the bracket means plate 26 at any selected position of the fastener 52 along the elongated slot 32, thereby permitting the stop portion 50 to be releasably secured at any selected position along the path 23 of the safety guard 20.

Use of the guard stop 10 will now be explained with reference to FIG. 4. The power tool 12 is switched off and disconnected from a power source for safety. The threaded fastener 52 and wing nut 56 should be sufficiently loose so that the stop member 28 rotates freely on the bracket means plate 26. A work piece 24 of the size to be cut is placed upon the work surface 14 flush against the fence 18 and pushed against the safety guard 20 causing the guard 20 to rotate away from the fence 18 exposing the cutting tool head 16. The stop member plate 28 is rotated towards safety guard 20 until the stop portion 50 contacts the proximal side of the safety guard 20. At that point, wing nut 56 is tightened down on the fastener 52 thereby fixedly but releasably securing the stop member 28 to the bracket plate 26 at a point where the stop portion 50 will permit only the work piece 24 to pass between the safety guard 20 and fence 18. The work piece 24 can continue to be passed between the fence 18 and safety guard 20 to assure that there is no binding. The power tool 12 may be thereafter plugged in and started and the work piece 24 passed between the fence 18 and the pivot 20. The stop portion 50 of the stop member 28 will permit the safety guard 20 to rotate away from the fence 18 sufficiently to only pass the work piece 24 between the fence 18 and the safety guard 20 and the shoulder bolt 44 pivot and will not permit the guard 20 to open further to allow the operator's hands to pass between the guard 20 and fence 18 along either side of the work piece 24.

An advantage of the invention is that it does not require a reconstruction of the cover member 46 or any other aspect of the basic machine tool 12. At most, all that needs to be done to install the stop guard 10 in tool 12 is to provide an annular spacer on original mounting bolt 44 along a threaded portion of the bolt 44 to permit the stop member 28 to pivot about the spacer, or to substitute another shoulder bolt having a longer shoulder than the original equipment bolt to permit the stop member 28 to pivot directly on the shoulder of the bolt 44.

Also, one of ordinary skill will appreciate that the present invention may be provided in other, less expensive or less versatile embodiments. For example, the guard stop may be as simple as a bolt or a nut on a bolt which is adjustably securable along a transverse edge on or along a slot within cover member 46, or something comparable. Moreover, the stop member may be as simple as a peg or other shaped member which can be received in any of a plurality of holes or in shaped portion of a continuous slot extending along cover member 46 or a member attached to and/or extending from the cover member 46. In such a case, the securing means would comprise the opening or slot and the portion of the stop member received in the opening or slot.

Figure 5:
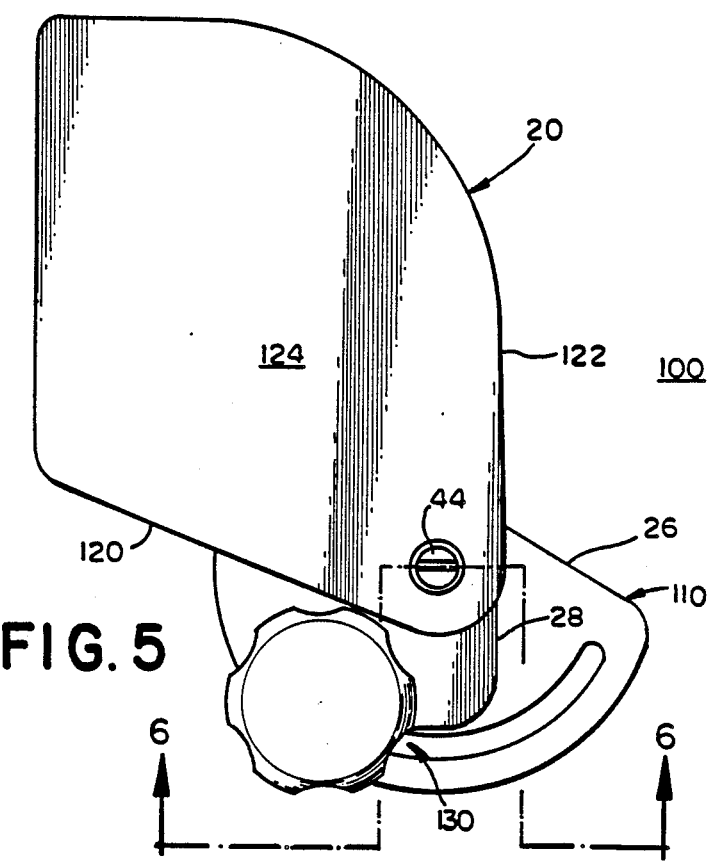
FIG. 5 is a top plan view of a safety guard/guard stop assembly ready to install on a power tool.

FIGS. 5 and 6, depict diagrammatically, a safety guard/guard stop assembly indicated generally at 100. The assembly 100 includes the safety guard 20 and a guard stop indicated generally at 110. The guard stop 110 again includes bracket means 26 and stop member 28. In place of the wing nut 56 a knurled knob 156 is supplied. Moreover, washer 58 in this embodiment 100 is positioned between the knob 156 and the top surface of the stop member plate 28, rather than between the stop member plate 28 and the bracket means plate 26. The slightly modified securing means provided by the knob 156, washer 58 and carriage bolt threaded fastener 52 is indicated generally at 130. As is indicated in the figures, the safety guard 20 typically includes a first vertical wall 120 and a second, arcuate vertical wall 122, each descending from a planar upper surface 124 of the safety guard 20. The edge portion 50 of the stop member 28 is sized so as to extend above the bottommost edge of the first vertical wall 120 and to contact that wall when the safety guard 20 is rotated away from the fence (not depicted) and towards the edge portion 50. The first wall 120 is shorter than the second arcuate wall 122 to pass over the stop tab member 42 which extends upwardly from the cover member 46 of the power tool 12 (see FIG. 4). However, the tab 42 is contacted by the second, arcuate vertical wall 122 to prevent full 360° rotation of the safety guard 20 around the shoulder bolt 44. Referring in particular to FIG. 6, the assembly 100 preferably further includes a coil spring 102 the first end of which 104 rests against the inner surface of the wall 122. A second tab end 106 of the spring 102 passes through slot 40 on the bracket means 28 (see FIG. 1) or through another slot or opening (not depicted), if such a second slot provided through the plate 26, or even over an edge of that plate 26 (for example, the top edge in FIG. 1), if desired. In this embodiment, a spacer 112 is provided on a threaded portion of the shoulder bolt 44 and is received in bore 39 of the stop member 28 (see FIG. 1). Spacer 112 on bolt 44 provides a pivot permitting rotation of the stop member 28 with respect to the bracket means plate 26. Preferably, a sheet metal press nut 114 is applied to the threaded end of carriage bolt 44, where that bolt end extends through the bracket means plate 26, to secure the safety guard 20 and spring 102 with the components of the guard stop 110. The assembly 100 is mounted to a machine tool like machine tool 12 in FIG. 4 simply by aligning the slot 40 in the bracket means plate 26 with the tab 42 provided on the cover member 46 of the machine tool 12 and threading the carriage bolt 44 into a threaded opening provided in the cover member 46 as previously described. Operation of the guard stop 110 is identical to the previously described operation of guard stop 10. Again, if desired, the spacer 112 can be eliminated from the pivot means by the provision of other suitable means, such as the extension of the shoulder of bolt 44. The bolt 44 would then constitute a sole pivot means passing through the safety guard 20, the bracket means plate 26 and stop member plate 28.

The press nut 114 on the threaded end of shoulder bolt 44 holds the guard stop 110 on the bolt 44 and the guard stop 110 and the safety guard 20 together. A press nut is preferred as it is sufficiently thin to permit direct mounting of the bolt 44 to the machine tool 12. Other means can be used to secure the components of the safety guard and guard stop together including other types of female threaded fasteners (hex nut, wing nut, threaded knob, etc.) threaded on the bolt end, a flexible twist strip with wire core, a flexible cinch strip secured around the bolt end, or a removable coating of plastic, wax, etc. applied to the bolt end.

While preferred embodiments have been disclosed and other variations thereto suggested, still additional variations will occur to one of ordinary skill in the art. Therefore, the present invention is not limited to the embodiment shown or suggested, but rather is defined by the appended claims.

I claim:

1. A guard stop for use on a power tool having a work surface, a cutting tool head projecting at least partially through the work surface, a fence projecting transversely to the work surface on a first side of the tool head and a safety guard mounted on a pivot located generally on a second side of the tool head opposite the fence, the pivot supporting the safety guard for rotation across the work surface, the safety guard being biased to an initial position proximal the fence fully covering the projecting portion of the tool head, the safety guard being rotatable about the pivot from the initial position along a path away from the fence when contacted by an object passing between the fence and the pivot to at least partially expose the tool head to the object, the guard stop comprising:

bracket means adapted for being fixedly secured to the power tool;

a stop member adapted to be movable among selectable positions on the bracket means, the stop member including a stop portion positioned along the path of the safety guard for contacting the safety guard when the stop member is located at any of the selectable positions; and securing means for releasably securing the stop member to the bracket means at any of the selectable positions.

2. The guard stop of claim 1 wherein the securing means extends through at least one of the stop member and the bracket means.

3. The guard stop of claim 2 wherein the securing means removably extends through both the stop member and the bracket means.

4. The guard stop of claim 1 wherein one of the bracket means and the stop member includes an elongated, arcuate edge along which the securing means can be moved and secured.

5. The guard stop of claim 4 wherein the arc of the arcuate edge is at least about 90°.

6. The guard stop of claim 4 wherein the arcuate edge is formed by an elongated slot through the bracket means.

7. The guard stop of claim 6 wherein the arc of the arcuate slot is at least about 90°.

8. The guard stop of claim 4 further comprising a bore through the bracket means and a bore through the stop member, the securing means being aligned with the arcuate edge when the two bores are coaxially aligned.

9. The guard stop of claim 8 wherein the coaxial bores align an elongated slot in one of the bracket means and the stop member with a third bore in the remaining one of the bracket means and the stop member and wherein the securing means comprises a fastener extending through the third bore and the elongated slot.

10. The guard stop of claim 1 wherein the securing means comprises a threaded fastener extending through at least one of the stop member and the bracket means.

11. The guard stop of claim 1 wherein the bracket means is a plate, the stop member is a separate plate generally parallel to the bracket means plate, a portion of the stop member plate being turned away from the bracket plate and forming the stop portion of the stop member.

12. The guard stop of claim 11 wherein each of the bracket means plate and the stop member plate has a bore therethrough.

13. The guard stop of claim 12 wherein the securing means comprises a securing member extending transversely from one of the bracket means plate and the stop member plate, and wherein coaxial alignment of bores of the bracket means plate and the stop member plate aligns the securing member from the one plate with an elongated slot in the other plate.

14. The guard stop of claim 13 in combination with the safety guard and pivot means for rotatably coupling the safety guard with the guard stop bracket means plate.

15. The guard stop of claim 1 in combination with the safety guard and means for coupling the safety guard and the guard stop together.

16. The combination of claim 16 wherein the coupling means comprises a pivot member passing through the safety guard, the bracket means and the stop member, the safety guard and the stop member being rotatable with respect to one another on the pivot member.

17. The combination of claim 16 wherein the pivot member has a threaded end protruding from the guard stop.

18. The combination of claim 17 further comprising a nut on the threaded end of the pivot member holding the guard stop on the pivot member.

19. The combination of claim 18 wherein the securing means comprises a threaded fastener extending through at least one of the stop member and the bracket means.

20. The combination of claim 19 wherein the bracket means is a plate, the stop member is a separate plate generally parallel to the bracket means plate, a portion of the stop member plate being turned away from the bracket plate and forming the stop portion of the stop member.

* * * * *